United States Patent
Majcen et al.

(10) Patent No.: US 10,434,625 B2
(45) Date of Patent: Oct. 8, 2019

(54) LATCHING MECHANISM USING DEPLOYABLE ARMS

(71) Applicants: Marjan Majcen, South Orange, NJ (US); Beverly Majcen, South Orange, NJ (US); Robert Vreznik, South Orange, NJ (US)

(72) Inventors: Marjan Majcen, South Orange, NJ (US); Beverly Majcen, South Orange, NJ (US); Robert Vreznik, South Orange, NJ (US)

( * ) Notice: Subject to any disclaimer, the term of this patent is extended or adjusted under 35 U.S.C. 154(b) by 0 days.

(21) Appl. No.: 15/256,581

(22) Filed: Sep. 4, 2016

(65) Prior Publication Data

US 2018/0079051 A1  Mar. 22, 2018

(51) Int. Cl.
| | | |
|---|---|---|
| *B23B 31/103* | (2006.01) | |
| *B24B 45/00* | (2006.01) | |
| *B23B 31/02* | (2006.01) | |
| *B23B 31/12* | (2006.01) | |
| *B23B 31/19* | (2006.01) | |
| *B24B 23/02* | (2006.01) | |

(52) U.S. Cl.
CPC .......... *B24B 45/006* (2013.01); *B23B 31/103* (2013.01); *B23B 31/023* (2013.01); *B23B 31/1261* (2013.01); *B23B 31/19* (2013.01); *B24B 23/028* (2013.01); *Y10T 279/15* (2015.01); *Y10T 279/33* (2015.01)

(58) Field of Classification Search
CPC ..... B23B 31/023; B23B 31/103; B23B 31/11; B23B 31/1261; B23B 31/19; B23B 2260/0725; B27B 5/30; B27B 5/32; B24B 45/006; Y10T 279/15; Y10T 279/16; Y10T 279/18; Y10T 279/33
See application file for complete search history.

(56) References Cited

U.S. PATENT DOCUMENTS

| | | | | |
|---|---|---|---|---|
| 186,245 | A * | 1/1877 | Harris | ...................... B23B 31/18 |
| | | | | 279/106 |
| 1,414,296 | A * | 4/1922 | Menten | ................... G01L 19/08 |
| | | | | 279/8 |
| 1,812,221 | A * | 6/1931 | Spencer | ............. B23B 31/1261 |
| | | | | 279/33 |
| 1,888,895 | A * | 11/1932 | Verkuil | ................. B23D 61/10 |
| | | | | 125/13.01 |
| 2,780,468 | A * | 2/1957 | Dunbar | .................. B23B 31/36 |
| | | | | 279/16 |

FOREIGN PATENT DOCUMENTS

FR           2250305 A5 *  5/1975   .......... B23B 31/103

* cited by examiner

*Primary Examiner* — Eric A. Gates
*Assistant Examiner* — Chwen-Wei Su
(74) *Attorney, Agent, or Firm* — Edwin D. Schindler

(57) ABSTRACT

A latching mechanism for a tool spindle or mandrel that latches by pivotally extending a plurality of tensioned arms from a tensioned seated state to a tensioned locked state through rotation of a lock ring pivotally deploying the arms from their nested seated state into a blade engaging position of a larger radius than the radius of the lock ring with the arms in their nested position.

15 Claims, 11 Drawing Sheets

LATCHING MECHANISM USING DEPLOYABLE ARMS

BACKGROUND OF THE INVENTION

Technical Field of the Invention

The present invention relates generally to motorized tool blade locks and, more particularly, to a latching mechanism that latches by pivotally extending a plurality of tensioned arms from a tensioned seated state to a tensioned locked state through rotation of a lock ring pivotally deploying the arms from their nested seated state into a blade engaging position of a larger radius than the radius of the lock ring with the arms in their nested position.

Preferably, blade locking by deploying arms from the nested state to a locked state is achieved through approximately 120°-rotation of the lock ring without the need for other tools and aids.

SUMMARY OF THE INVENTION

A primary object of the present invention is to provide a latching mechanism for mounting tools onto a spindle or mandrel.

A further object of the present invention is to provide a latching mechanism having a cylindrical housing with interior threads for mounting the housing onto a spindle.

An additional object of the present invention is to provide a cylindrical housing exterior wall having helical channels therein.

It is, yet, a further object of the present invention is to provide a latching mechanism wherein the cylindrical housing exterior wall comprises a cylindrical portion, a sloped wall portion and a distal end flanged portion.

Yet another object of the present invention is to provide a latching mechanism having a tool lock with a bore incorporating tabs/rails positioned within the cylindrical housing exterior rails.

Another object of the present invention is to provide a latching mechanism wherein the tool lock provides a plurality of tensioned pivotal arms.

It is, yet, further object of the present invention is to provide a latching mechanism wherein the tensioned pivotal arms have interiorly extending bore tabs, so that rotation of the tool lock causes the bore tabs to deploy the arms as the bore tabs rotatively descend along the cylindrical housing exterior wall.

The foregoing and related objects are accomplished by the present invention for a latching mechanism for mounting tools onto a spindle or mandrel, which includes a substantially cylindrical housing having a flange for serving as a housing base with the housing having fastener mounting means for attaching the housing to a spindle. A tool lock provides bore mounting means for attaching the tool lock onto the housing with the tool lock having a plurality of deployable tensioned pivotal arms provided as latching means for holding a tool attachment between the housing flange and pivotal arms of the tool lock, and a pivotal arm tensioning member retains the pivotal arms in a tool lock subjacent position and returns the arms from a deployed position to their seated subjacent position.

In an alternatively preferred embodiment, the latching system for mounting tools onto a spindle or mandrel, includes a spindle mount member having threaded bore, a spindle mount flange a and cylindrical body having a cavity receiving a fastener. The substantially cylindrical housing has a flange serving as housing base with the housing having a bore for mounting onto the spindle mount member and an exterior wall fastener extendable into the spindle mount cavity. A tool lock includes bore mounting means for attachment onto the housing with the tool lock having a plurality of deployable pivotal arms provided as latching means for holding a provided tool between the housing flange and the pivotal arms of the tool lock, and a pivotal arm tensioning member holds the pivotal arms in a tool lock subjacent position and returns the arms from a deployed position to their seated subjacent position.

The present invention overcomes the shortcomings of the prior art by providing a latching mechanism that latches by pivotally extending a plurality of tensioned arms from a tensioned seated state to a tensioned locked state through rotation of a lock ring pivotally deploying the arms from their nested seated state into a blade engaging position of a larger radius than the radius of the lock ring with the arms in their nested position.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the present invention.

BRIEF DESCRIPTION OF THE DRAWING FIGURES

In the drawing, wherein similar reference numerals and symbols denote similar features throughout the several views.

Figure 1:
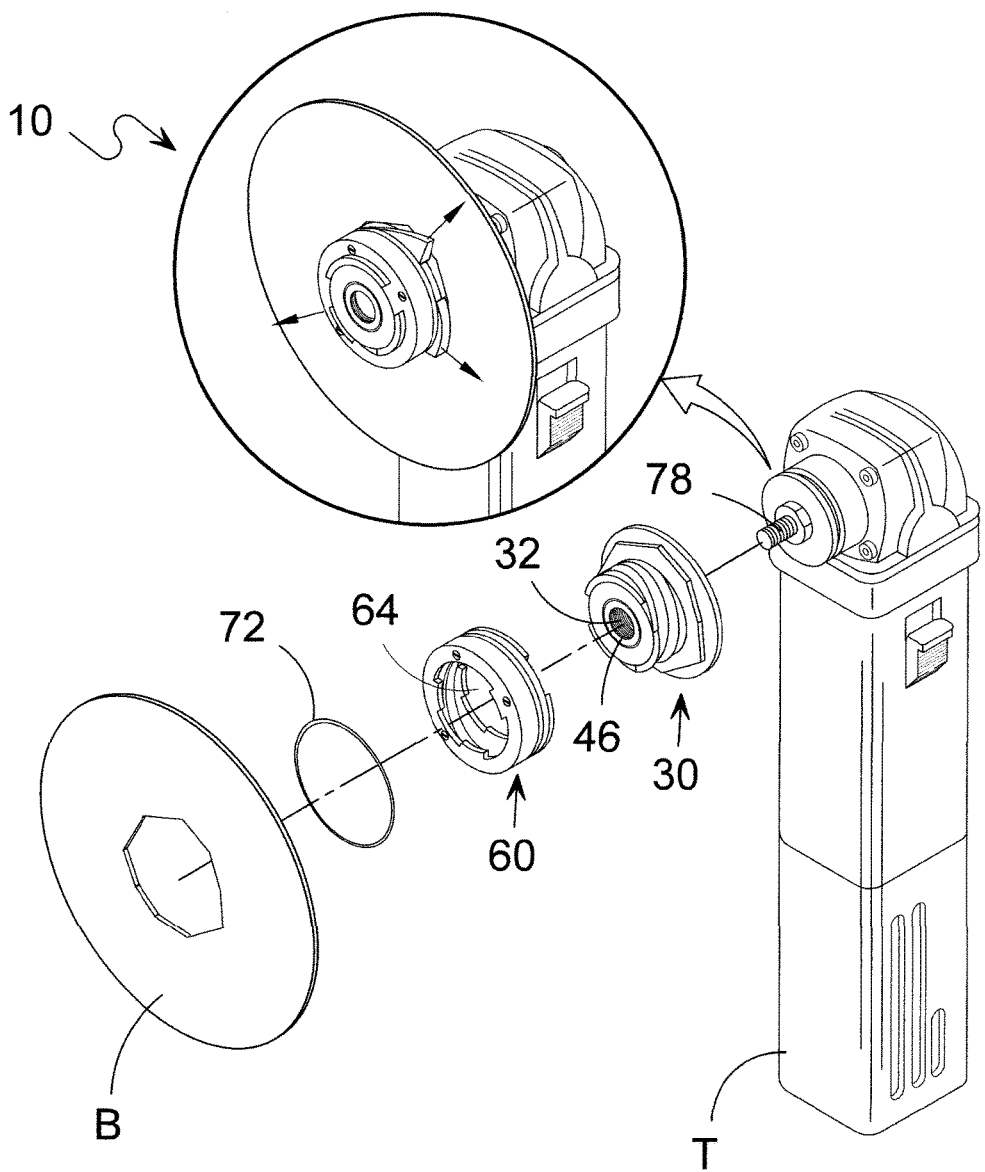
FIG. 1 is an exploded view of an enablement of the latching mechanism for attaching a tool attachment to a spindle.

DESCRIPTION OF THE REFERENCED NUMERALS AND LETTERS APPEARING IN THE DRAWING FIGURES

Turning now descriptively to the drawings, in which similar reference characters denote similar elements throughout the several views, the figures illustrate the latching system for mounting tools onto a spindle of the present invention. With regard to the reference numerals used, the following numbering is used throughout the various drawing figures:

10 latching system for mounting tools onto spindle or mandrel
12 spindle mount
14 spindle mount flange
16 spindle mount bore
18 threads of 16
20 fastener cavity of 12
30 cylindrical housing
32 housing bore
34 housing wall
36 flanged distal end of 34
38 sloped portion of 34
40 cylindrical portion of 34
42 housing flange of 30
44 helical channel of 34
46 threads of 32
48 polygonal blade bore frame
50 fastener aperture
52 fastener of 20, 50
60 tool lock
62 tool lock housing
64 tool lock housing bore
66 tab/rail of housing bore wall
68 subjacent tensioned pivotal arm
70 tensioning member receptacle
72 tensioning member of 68
74 fastener of 68
76 tab of 68
78 spindle
80 fastener cavity of 40
82 bore tabs of 68
T tool
B tool attachment

DETAILED DESCRIPTION OF THE DRAWING FIGURES AND PREFERRED EMBODIMENTS

The following discussion describes in detail a preferred embodiment of the invention, and several variations of that embodiment. This discussion should not be construed, however, as limiting the invention to those particular preferred embodiments and practitioners skilled in the art will recognize numerous other embodiments as well. For definition of the complete scope of the invention, the reader is directed to appended claims;

Turning, in detail, to the drawing figures, FIG. 1 is an exploded view of an enablement of the latching mechanism for attaching a tool attachment to a spindle. The present invention provides a latching mechanism 10 having a spindle mounting member comprising cylindrical housing 30 with housing bore 32 having threads 46 for mounting the housing 30 onto spindle 78 and tool lock 60 having bore 64 mountable onto housing 30. Also shown is pivotal arm tensioning member 72 and tool attachment B mounted onto housing 30 where then tool lock 60 is rotated deploying the tensioned pivotal arms into engagement with tool attachment B securely latched therein.

Figure 2:
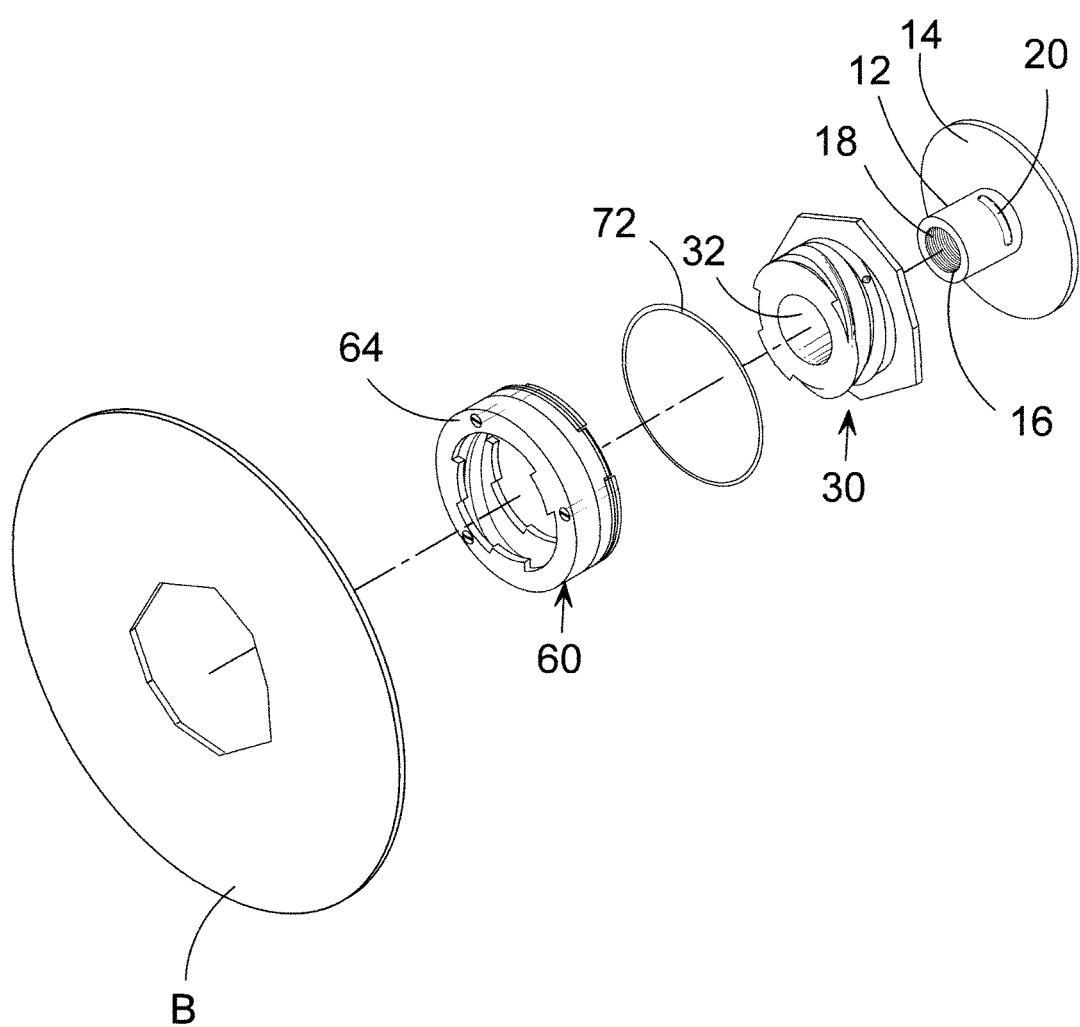
FIG. 2 is an exploded view of an alternative enablement of the latching mechanism for attaching a tool attachment to a spindle.

FIG. 2 shows an exploded view of another enablement of the latching mechanism for attaching a tool attachment to a spindle. The present invention provides a latching mechanism 10 having a spindle mount 12 having spindle mount flange 14 and bore 16 with threads 18 serving as spindle mount and seat for securing housing 30 to mount 12 using a set screw or similar anchor fastener positioned in co-aligned apertures 20, 78 cylindrical housing 30 having housing bore 32 for mounting the housing 30 onto spindle mount 12 and tool lock 60 having bore 64 mountable onto housing 30. Also shown is pivotal arm tensioning member 70 mountable to tool lock 60 providing tensioned pivotal arms movable from a seated seat to a deployed state through tool lock 60 rotation.

Figure 3:
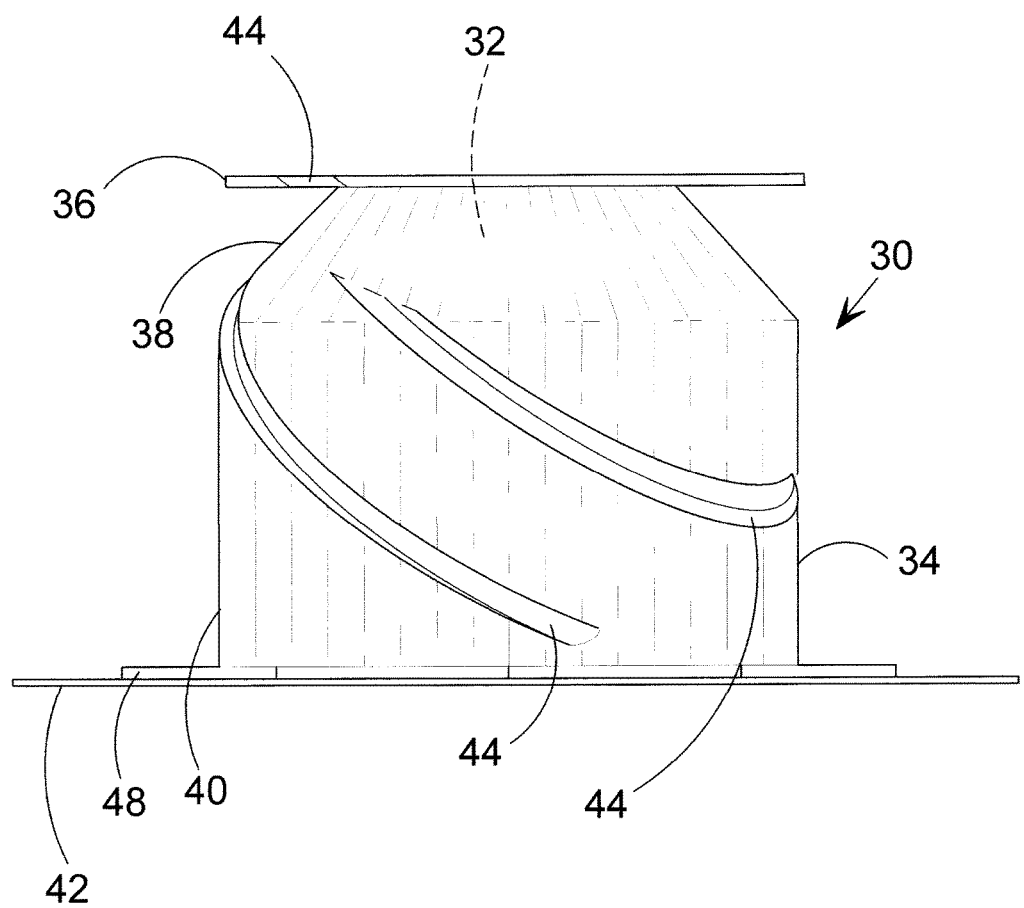
FIG. 3 is a side view of the latching mechanism cylindrical housing.

Referring to FIG. 3, shown is a side view of the latching mechanism cylindrical housing. The cylindrical housing 30 provides flange 42 having a polygonal blade bore frame 48 for mounting tool attachments B having a polygonal bore mount. Housing 30 extends through a cylindrical portion 40 then tapers inward by a sloped portion 38 terminating in flanged distal end 36 with a plurality of helical channels 44 substantially extending the length of the housing.

Figure 4:
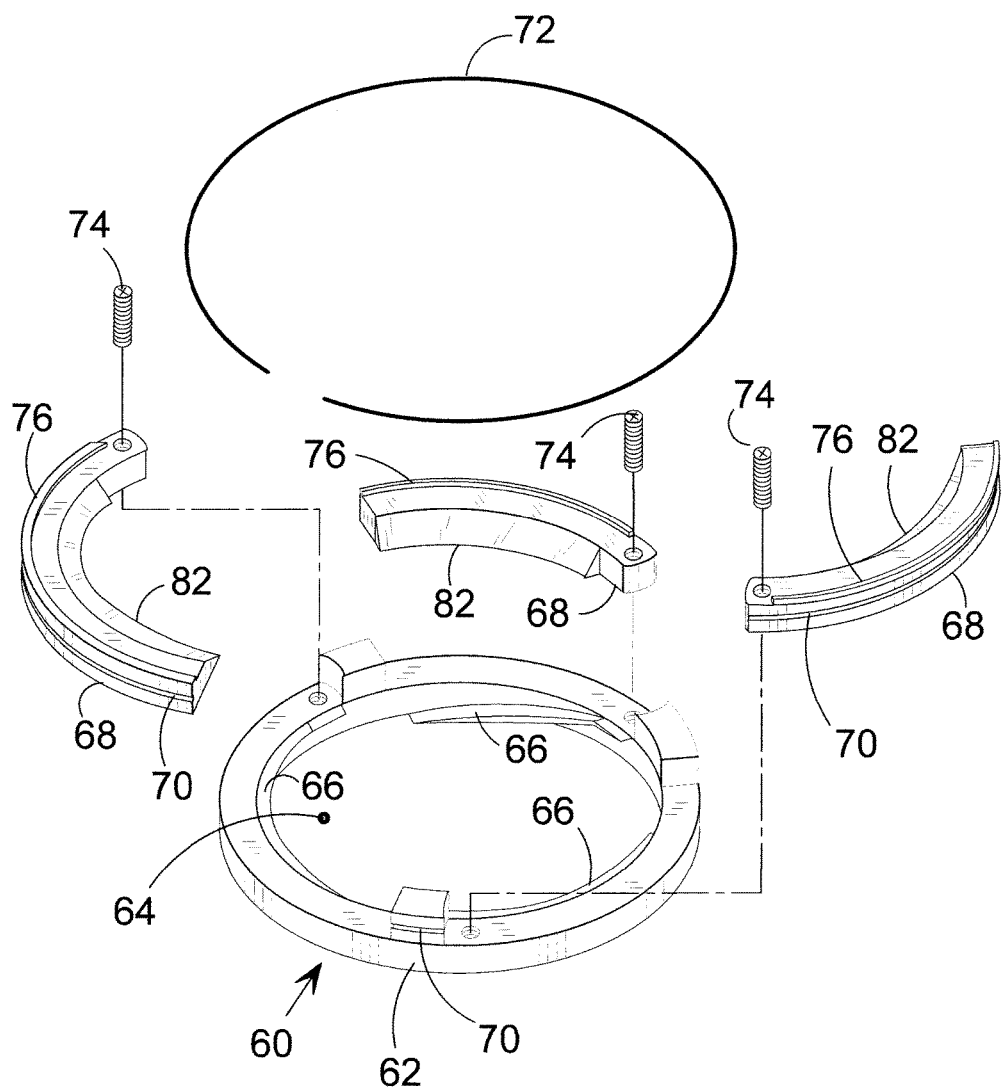
FIG. 4 is an exploded bottom view of the tool lock.

With respect to FIG. 4, shown is an exploded bottom view of the tool lock. Tool lock 60 provides housing 62 having a tensioning member receptacle 70 spacer tab 76 and bore tab 82 with arm 68 fastened to housing 62 via fastener 74. Housing 68 further provides bore 64 having a plurality of bore wall tab/rails 66 positioned to co-align with the helical channels of the housing wall.

Figure 5:
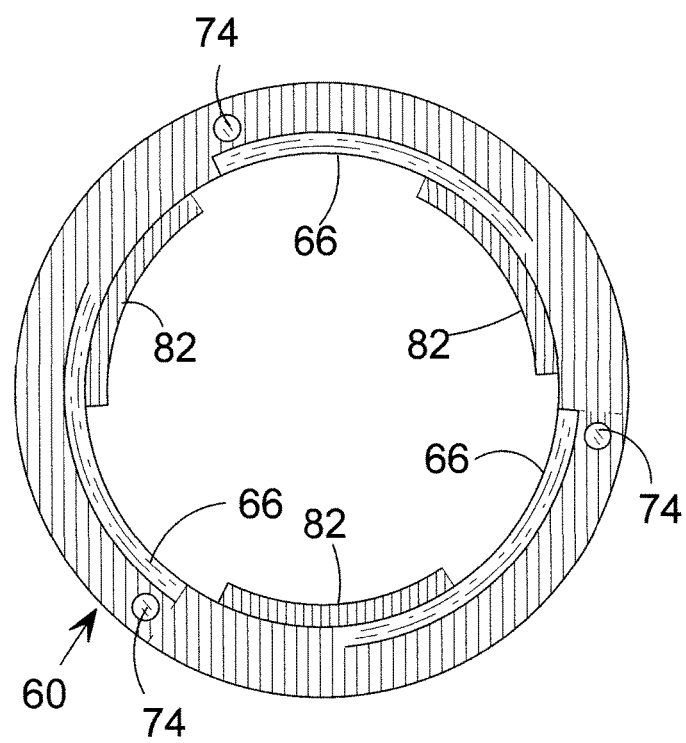
FIG. 5 is a top plan view of the tool lock.

FIG. 5 presents a top plan view of the tool lock. Tool lock 60 provides housing 62 having tab/rail of housing bore wall 66 and subjacent arms having bore tab 82 with opposing side bore wall tabs having a smaller diameter than bore tab 82.

Figure 6:
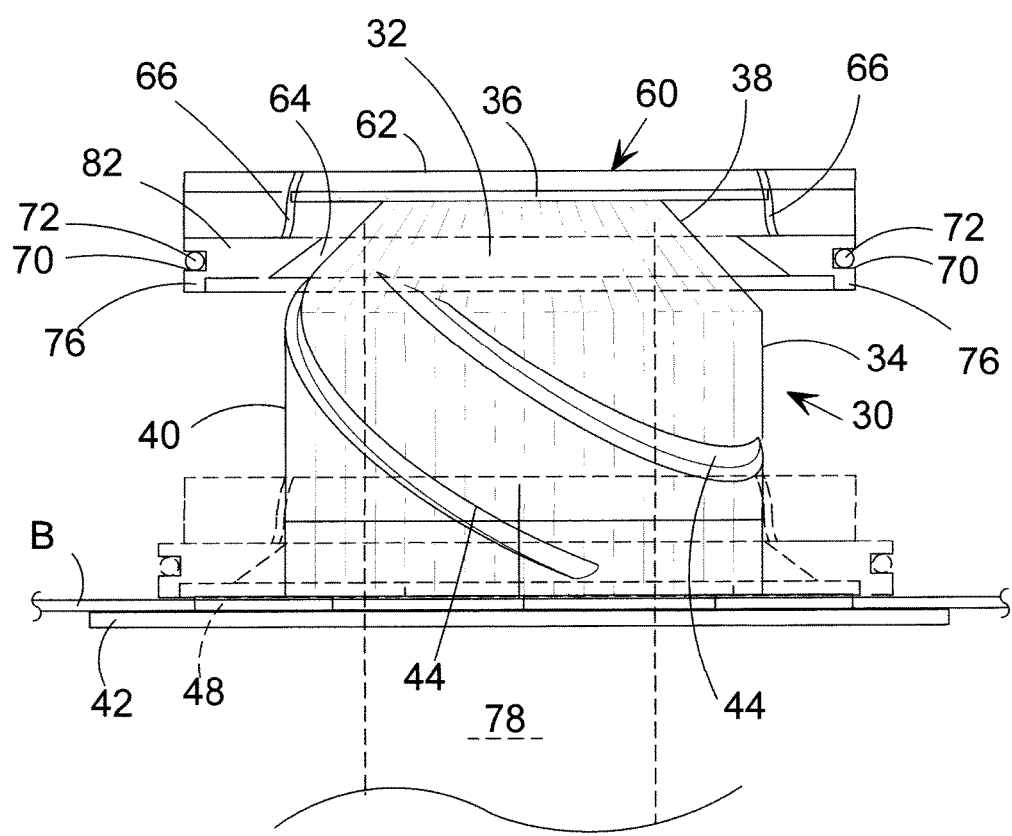
FIG. 6 is the tool lock mounted on the cylindrical housing moving from a seated state to locked state with tensioned arms deployed to tool attachment engagement.

FIG. 6 shows the tool lock mounted on the cylindrical housing moving from a seated state to locked state with tensioned arms deployed to tool attachment engagement. Tool lock 60 provides housing 62 having bore 64 with bore wall tab/rail 66 mating with housing 30 helical rail 44 for rotatively moving tool lock 60 along housing 30 exterior wall 34 helical rail 44 by virtue of tool lock 60 bore tabs 68 following contour of wall 34, the tensioned pivotal arms are extended to a tool attachment engaging position.

Figure 7:
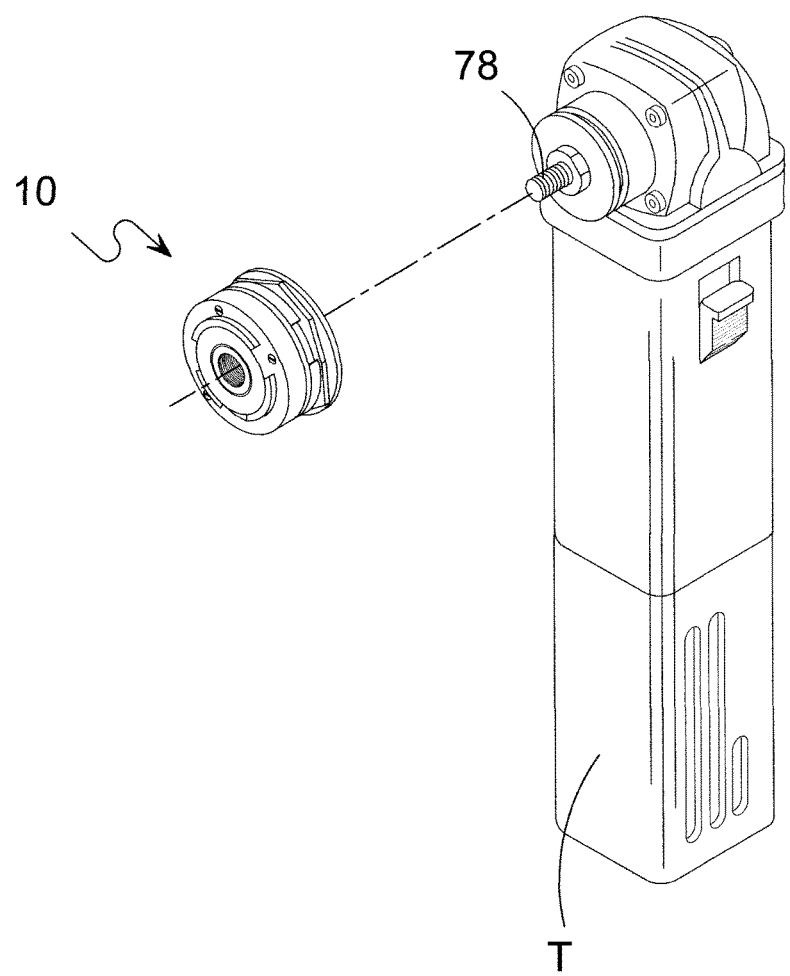
FIG. 7 is an exploded prospective view showing a tool having a spindle with the latching mechanism ready to be mounted onto the tool spindle.
Figure 8:
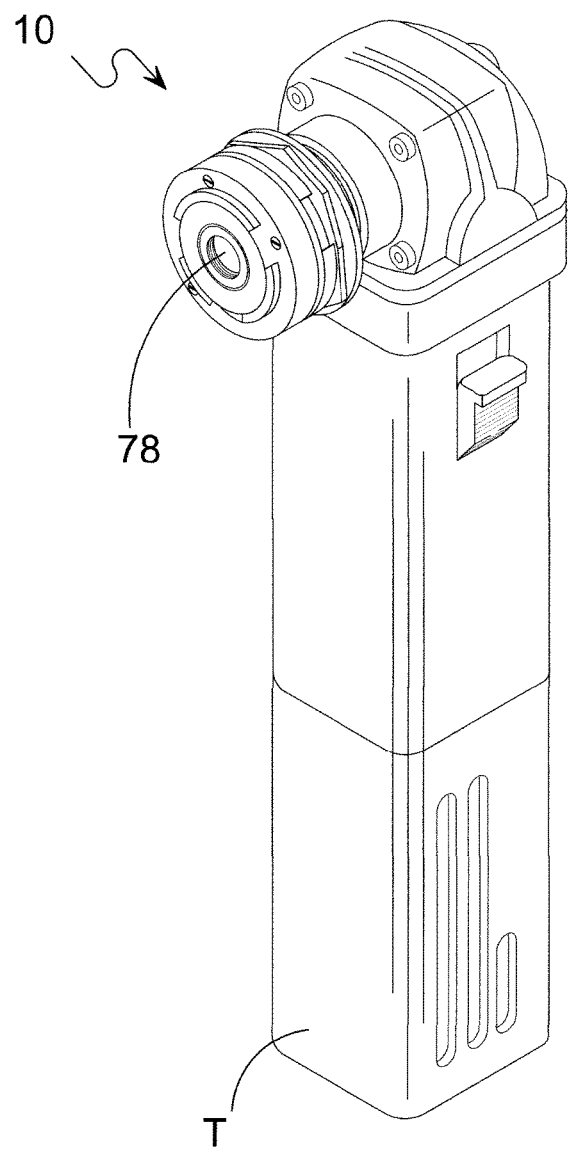
FIG. 8 is a prospective view showing the latching mechanism of FIG. 7 mounted onto a tool spindle.
Figure 9:
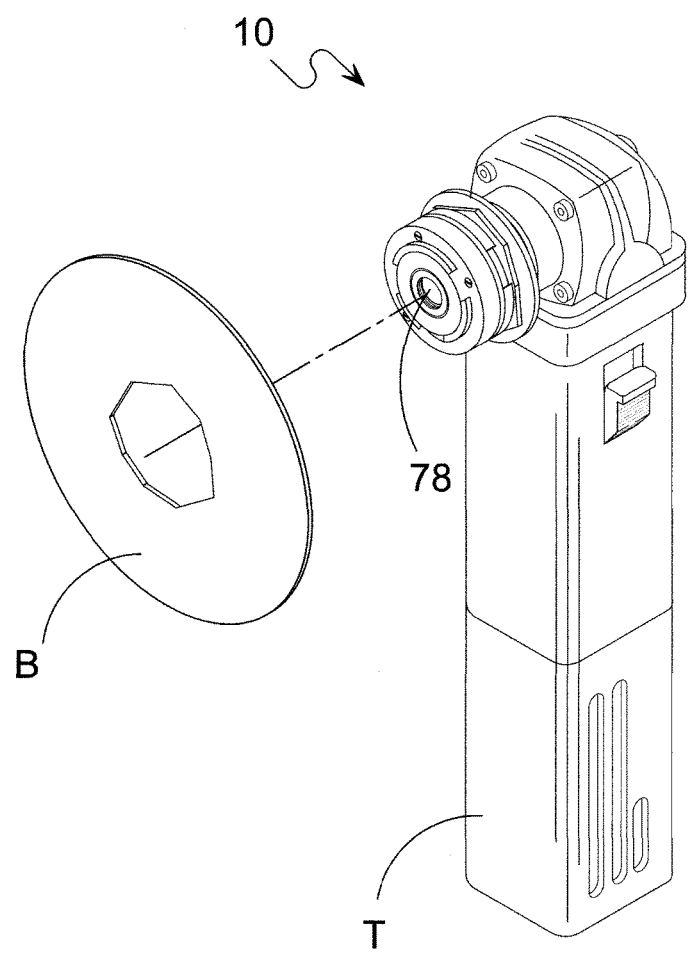
FIG. 9 is an exploded prospective view showing a tool attachment ready to be fastened to the latching mechanism.
Figure 10:
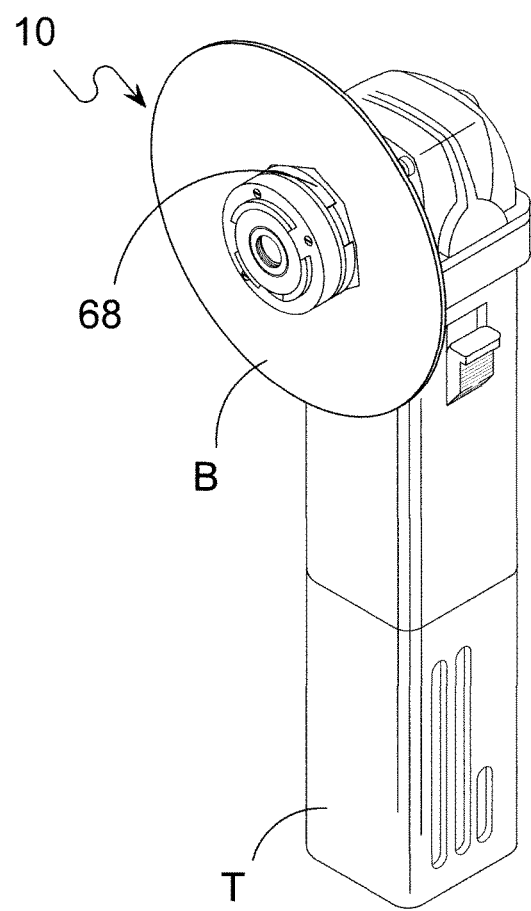
FIG. 10 is a prospective view showing the tool attachment of FIG. 9 mounted of onto the latching mechanism.
Figure 11:
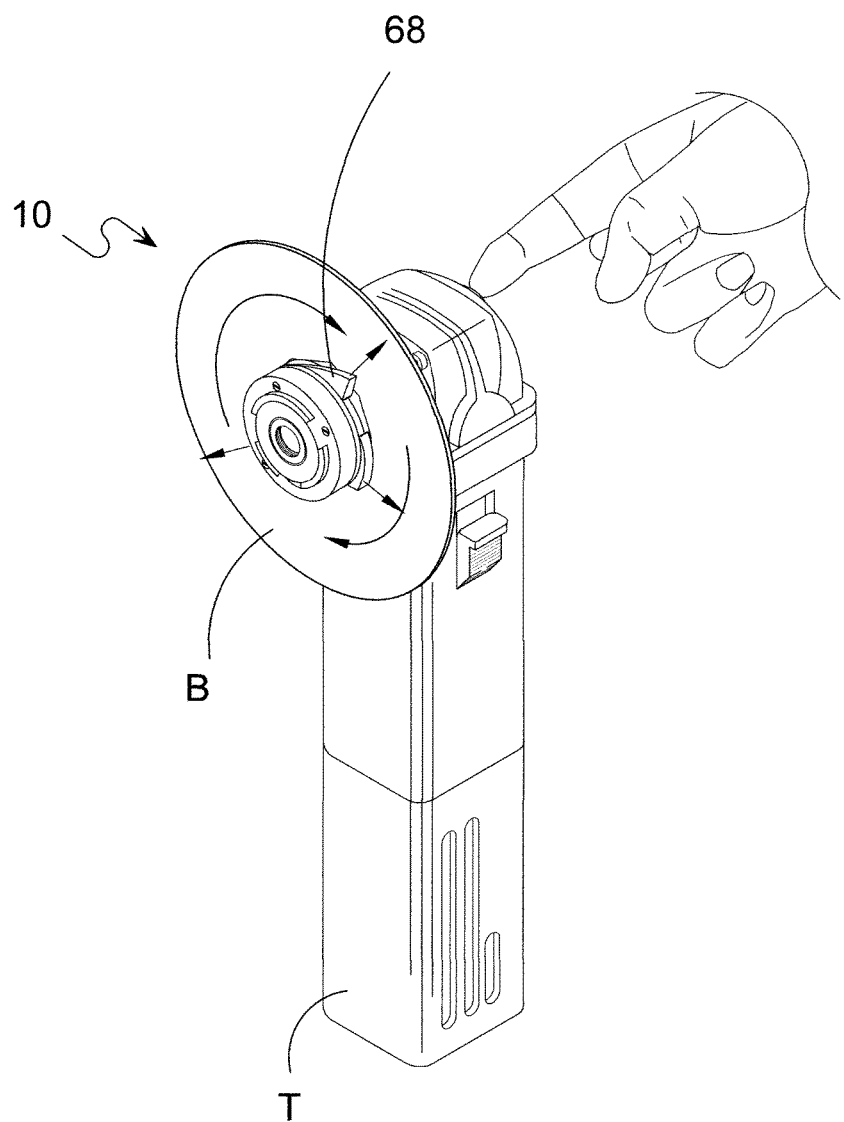
FIG. 11 is a prospective view showing the tool lock rotated causing the tensioned pivotal arms to deploy into engagement with the tool attachment.

Finally, with reference to FIGS. 7 through 11, shown are stepwise views of the tool latching mechanism in use. FIG. 7 depicts tool T having spindle 78 and latching mechanism 10 ready to be threadedly mounted to spindle 87. FIG. 8 depicted the latching mechanism installed onto a tool spindle. FIG. 9 depicted tool attachment B ready to be mounted onto latching mechanism 10, while FIG. 10 depicts tool attachment B mounted on latching mechanism 10 and FIG. 11 shows rotation of the tool lock 10 deploying the tensioned pivotal arms to engagement with tool attachment B.

While only several embodiments of the present invention have been shown and described, it will be obvious to those skilled in the art that many modifications may be made to the present invention without departing from the spirit and scope thereof.

What is claimed is:

1. A latching mechanism for mounting tools onto a spindle or mandrel, comprising:
    a substantially cylindrical housing having a flange as a housing base with said housing having fastener mounting means for attaching said housing to a spindle;
    a tool lock ring having bore mounting means for attaching said lock ring onto said housing with said lock ring having a plurality of deployable tensioned pivotal arms provided as latching means for holding a tool attachment between said flange and said deployable tensioned pivotal arms of said lock ring with said lock ring having an initial radius when said deployable tensioned pivoted arms are in a subjacent position; and a pivotal arm retainer for holding said deployable tensioned pivotal arms in said subjacent position and returning said deployable tensioned pivotal arms from a blade engaging deployed position to said subjacent position via rotation of said lock ring for pivotally deploying, and subsequently returning, said deployable tensioned pivotal arms from said subjacent position into said blade engaging deployed position of a larger radius than said initial radius of said lock ring when said deployable tensioned pivotal arms are in said subjacent position.

2. The latching system for mounting tools onto a spindle or mandrel according to claim 1, wherein said fastener mounting means is a threaded bore.

3. The latching system for mounting tools onto a spindle or mandrel according to claim 1, further comprising a housing exterior surface extending in length from said flange to a predetermined point, then diametrically decreasing for a predetermined length to a distal end of said flange of said housing.

4. The latching system for mounting tools onto a spindle or mandrel according to claim 3, further comprising a tool lock having a locked position and an unlocked position, wherein said housing exterior surface includes a plurality of helical channels extending longitudinally substantially between a distal end of said housing to said flange of said housing for serving as a guide path for said tool lock rotatively moving between said locked position and said unlocked position.

5. The latching system for mounting tools onto a spindle or mandrel according to claim 4, wherein said helical channels vertically extend through an arc greater than 90° and less than 180°.

6. The latching system for mounting tools onto a spindle or mandrel according to claim 5, wherein said deployable tensioned pivotal arms further include tabs extending into the bore serving as stop when said deployable tensioned pivotal arms are in their said blade engaging deployed position and subjacent position.

7. The latching system for mounting tools onto a spindle or mandrel according to claim 4, wherein said tool lock has a plurality of tabs extending into its bore positioned for said plurality of lock tabs to travel along a respective helical channel.

8. The latching system for mounting tools onto a spindle or mandrel according to claim 4, wherein moving said tool lock toward said flange of said housing moves flanges of said deployable tensioned pivotal arms into engagement with an increasing housing diameter causing radial deployment of the deployable tensioned pivotal arms into locked engagement with the tool.

9. A latching system for mounting tools onto a spindle or mandrel, comprising:
a spindle mount member having threaded bore, spindle mount flange and cylindrical body having a cavity receiving a fastener;
a substantially cylindrical housing having a flange as housing base with said housing having a bore for mounting onto said spindle mount member and an exterior wall fastener extendable into the spindle mount cavity;
a lock ring having bore mounting means for attachment onto said housing with said lock ring having a plurality of deployable pivot arms provided as latching means for holding a tool between said flange of said housing and said deployable pivot arms of said lock ring with said lock ring having an initial radius when said deployable tensioned pivoted arms are in a subjacent position; and,
a pivotal arm retainer for holding said deployable pivotal arms in a lock ring subjacent position and returning said deployable pivotal arms from a bladed engaging deployed position to said subjacent position via rotation of said lock ring for pivotally deploying, and subsequently returning, said deployable tensioned pivotal arms from said
subjacent position into said blade engaging deployed position of a larger radius than said initial radius of said lock ring when said deployable tensioned pivotal arms are in said subjacent position.

10. The latching system for mounting tools onto a spindle or mandrel according to claim 9, further comprising a housing exterior surface extending in length from said flange to a predetermined point, then diametrically decreasing for a predetermined length to a distal end of said flange of said housing.

11. The latching system for mounting tools onto a spindle or mandrel according to claim 10, further comprising a tool lock having a locked position and an unlocked position, and a housing exterior surface with a plurality of helical channels extending longitudinally substantially between a distal end of said housing to said flange of said housing as a guide path for said tool lock rotatively moving between said locked and said unlocked positions.

12. The latching system for mounting tools onto a spindle or mandrel according to claim 11, wherein said helical channels vertical extend through an arc greater than 90° and less than 180°.

13. The latching system for mounting tools onto a spindle or mandrel according to claim 11, wherein said lock ring has a plurality of tabs extending into its bore positioned for said plurality of lock tabs to travel along a respective helical channel.

14. The latching system for mounting tools onto a spindle or mandrel according to claim 13, wherein said deployable tensioned pivotal arms further include tabs extending into the bore serving as stop when said deployable tensioned pivotal arms are in blade engaging deployed position.

15. The latching system for mounting tools onto a spindle or mandrel according to claim 9, wherein moving said lock ring toward said flange of said housing moves flanges of said deployable tensioned pivotal arms into engagement with an increasing housing diameter causing radial deployment of said deployable tensioned pivotal arms into locked engagement with the tool.

* * * * *